US009317978B2

(12) United States Patent
Hiruta et al.

(10) Patent No.: US 9,317,978 B2
(45) Date of Patent: Apr. 19, 2016

(54) CONDITION MONITORING SYSTEM, CONDITION MONITORING SYSTEM UNIT, AND TERMINAL SYSTEM UNIT

(71) Applicant: Hitachi Construction Machinery Co., Ltd., Bunko-ku, Tokyo (JP)

(72) Inventors: Tomoaki Hiruta, Tokyo (JP); Hideaki Suzuki, Tokyo (JP); Junsuke Fujiwara, Tokyo (JP); Takayuki Uchida, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 249 days.

(21) Appl. No.: 14/183,907

(22) Filed: Feb. 19, 2014

(65) Prior Publication Data

US 2014/0232539 A1 Aug. 21, 2014

(30) Foreign Application Priority Data

Feb. 20, 2013 (JP) .................................. 2013-031227

(51) Int. Cl.
*B60Q 1/00* (2006.01)
*G07C 5/08* (2006.01)
*G06F 9/50* (2006.01)
*H04L 29/08* (2006.01)
*G07C 5/00* (2006.01)

(52) U.S. Cl.
CPC ................ *G07C 5/08* (2013.01); *G06F 9/5066* (2013.01); *G07C 5/008* (2013.01); *H04L 29/08135* (2013.01)

(58) Field of Classification Search
CPC ............ G06F 9/5066; G06F 17/30554; G06F 17/30873; H04L 29/08135
USPC .................... 340/438; 709/206; 712/203, 220
See application file for complete search history.

(56) References Cited

U.S. PATENT DOCUMENTS

| 8,275,522 B1 * | 9/2012 | Groeneweg et al. ............ 701/50 |
| 8,423,605 B2 * | 4/2013 | Kawai ............................ 709/203 |
| 8,583,333 B2 * | 11/2013 | Rennie et al. ................... 701/50 |
| 2012/0078440 A1 * | 3/2012 | Oravis et al. ...................... 701/1 |

FOREIGN PATENT DOCUMENTS

JP 2011-147493 A 8/2011

* cited by examiner

*Primary Examiner* — John A Tweel, Jr.
(74) *Attorney, Agent, or Firm* — Crowell & Moring LLP

(57) ABSTRACT

A condition monitoring system includes a terminal system unit and a condition monitoring system unit connected together via radiocommunication channels. The terminal system unit is mounted on a self-propelled machine, while the monitoring system unit is arranged at a control center. The monitoring system unit is provided with a unit for setting an alarm delivery condition, another unit for setting an aggregation condition, a further unit for transmitting the alarm delivery condition and aggregation condition so set, and a screen display unit for displaying various information. The terminal system unit is provided with an alarm creation unit for creating alarm information according to the alarm delivery condition so transmitted, an aggregate data creation unit for creating aggregate data according to the transmitted aggregation condition, and a data transmitting unit for transmitting the alarm information and aggregate data so created.

13 Claims, 19 Drawing Sheets

FIG. 4

ALARM DELIVERY CONDITIONS DB1201

| | ALARM ID | ALARM NAME | DIAGNOSIS METHOD | SENSOR TYPE | REFERENCE DATA | ALARM DELIVERY CONDITION | CONDITION ID | TARGET MODEL |
|---|---|---|---|---|---|---|---|---|
| 1201a | 1 | ENGINE ABNORMALITY | THRESHOLD VALUE PROCESSING | SENSOR A | — | $A \geqq 10$ | 1 | Model-1<br>Model-2 |
| 1201b | 2 | PUMP ABNORMALITY | K-MEANS CLUSTERING | SENSOR B<br>SENSOR C<br>SENSOR D | datafile0 | DISTANCE $\geqq 100$ | - | Model-1<br>Model-2<br>Model-3 |

FIG. 5

AGGREGATION CONDITIONS DB1202

| | ALARM ID | SENSOR TYPE | WINDOW WIDTH | NUMBER OF BINS | WIDTH | AGGREGATION TIME PERIOD |
|---|---|---|---|---|---|---|
| 1202a | 1 | SENSOR A | 10 SEC | 5 | - | 1 DAY |
| 1202b | 2 | SENSOR B SENSOR C SENSOR D | 1 SEC | — | 1 | 3 DAYS |

FIG. 6

OPERATION MODE CONDITION DB1203

| | CONDITION ID | SENSOR TYPE | CONDITIONAL EXPRESSION |
|---|---|---|---|
| 1203a | 1 | SENSOR $\alpha$ | SENSOR $\alpha > 0$ |
| 1203b | 2 | SENSOR $\beta$<br>SENSOR $\gamma$ | $0 \leqq$ SENSOR $\beta \leqq 100$<br>SENSOR $\gamma = 1$ |

FIG. 9

ALARM ID  1
MODEL  Model-1, Model-2
ALARM  ENGINE ABNORMALITY          } 9a
DIAGNOSIS METHOD  THRESHOLD VALUE
CONDITION ID  1

PLEASE INPUT CONDITION.

[ 10 ] ≦ SENSOR A ≦ [ NaN ]   } 9b

9c

EXPECTED NUMBER AND PROBABILITY OF ALARM DELIVERIES ARE AS FOLLOWS:

| MACHINE No. | NUMBER OF ALARM DELIVERIES | PROBABILITY OF ALARM DELIVERIES | AGGREGATION TIME PERIOD | DETAILS |
|---|---|---|---|---|
| 1 | 100 | 2% | 1 DAY | 9e |
| 2 | 200 | 4% | 2 DAYS | |

9d

| AGGREGATION CONDITIONS (9f) | OPERATION MODE CONDITIONS (9g) | RECORDS (9h) |

FIG. 12

ALARM INFORMATION DB2201

| | MODEL | MACHINE No. | ALARM ID | DELIVERY TIME OF ALARM |
|---|---|---|---|---|
| 2201a | Model-1 | 1 | 1 | 2012/8/31 10:00 |
| 2201b | Model-1 | 1 | 1 | 2012/8/31 10:05 |

FIG. 16

| MODEL | MACHINE No. | ALARM ID | TIME | AGGREGATE DATA |
|---|---|---|---|---|
| Model-1 | 1 | 1 | 2012/8/31 10:00 | |
| Model-1 | 1 | 1 | 2012/8/31 10:05 | |

FIG. 17

ALARM INFORMATION DB2201-1

| MODEL | MACHINE No. | ALARM ID | TIME | TRANSMITTED FLAG | DEGREE OF DEVIATION |
|---|---|---|---|---|---|
| Model-1 | 1 | 1 | 2012/8/31 10:00 | 0 | 10 |
| Model-1 | 1 | 1 | 2012/8/31 10:05 | 1 | 100 |

FIG. 18

|  | SENSOR B 18b | | | |
|---|---|---|---|---|
|  | 0~40 | 40~80 | 80~120 | 120~160 |
| 0~4 |  |  |  |  |
| 4~8 |  |  |  |  |
| 8~12 |  |  | 18c |  |
| 12~16 |  |  |  |  |
| 16~20 |  |  |  |  |

SENSOR A 18a

CONDITION MONITORING SYSTEM, CONDITION MONITORING SYSTEM UNIT, AND TERMINAL SYSTEM UNIT

CROSS-REFERENCE TO RELATED APPLICATION

This application claims the priority of Japanese Patent Application 2013-031227 filed Feb. 20, 2013, which is incorporated herein by reference.

BACKGROUND OF THE INVENTION

1. Field of the Invention

This invention relates to a condition monitoring system for monitoring the condition of a self-propelled machine, and also to a condition monitoring system unit and terminal system unit useful in the condition monitoring system.

2. Description of the Related Art

Working machines (self-propelled machines) used in mines and the like, such as excavators and dump trucks, are required to operate for 24 hours a day. Working machines of this kind are provided with a controller and various sensors. The controller monitors whether or not sensor data inputted from the various sensors or processed data obtained by processing the sensor data have normal values. If at least one of the sensor data or processed data exceeds a corresponding threshold value set as a condition for delivering an alarm, the controller delivers an alarm to urge an operator to maintain a normal condition. Further, the information of the alarm is transmitted, via a radiocommunication system, from a terminal system unit on the working machine to a condition monitoring system unit arranged in a control room. A supervisor understands the condition of the working machine by confirming alarm information displayed on a control screen of a condition monitoring system unit. It is, therefore, important to set a suitable condition for the delivery of an alarm.

As a technology for setting such a suitable condition for the delivery of an alarm, JP-A-2011-147493 is known, for example. JP-A-2011-147493 describes: "On a screen with a trend graph, which indicates historical data of biological information, being displayed thereon, a biological information monitoring system receives from a user an input of an alarm value about the biological information. When the alarm value is inputted, ranges Tb1,Tb2 where an alarm is to be triggered are displayed in the trend graph according to the inputted alarm value (upper limit line: Lb1, lower limit line: Lb2) such that the ranges Tb1,Tb2 can be distinguished from other ranges. If the alarm value has already been set in the past, the ranges Tb1,Tb2 where an alarm is to be triggered by the new alarm value are displayed, in the trend graph, distinguishably from ranges Ta1,Ta2 where an alarm was actually triggered." (see the Abstract).

SUMMARY OF THE INVENTION

As described in JP-A-2011-147493, it is effective for the appropriate setting of a condition for the delivery of an alarm to display ranges, in which an alarm is to be triggered by a new alarm value, and ranges, in which an alarm was actually triggered, distinguishably from each other in a trend graph. If the technology described in JP-A-2011-147493 is applied, as it is, to a condition monitoring system that monitors the conditions of working machines used in amine or the like, however, each working machine has to transmit all sensor data, which the working machine carries, to a condition monitoring system unit, which is arranged at a remote location, via a radiocommunication system. A problem, therefore, arises in that a large communication load is applied between each working machine and the condition monitoring system unit.

With a view to resolving the above-described problem, the present invention has as a first object thereof the provision of a condition monitoring system that can reduce communication loads between a self-propelled machine such as an excavator or dump truck and a condition monitoring system unit. The present invention also has as a second and third objects thereof the provision of a condition monitoring system unit and terminal system unit suitable for the condition monitoring system.

To achieve the above-described first object, the present invention provides a condition monitoring system comprising a terminal system unit, which is mounted on a self-propelled machine, and a condition monitoring system unit, which is arranged at a control center, connected together via radiocommunication channels, wherein the condition monitoring system unit is provided with an alarm delivery condition setting unit for setting an alarm delivery condition as a condition under which the self-propelled machine is to deliver an alarm, an aggregation condition setting unit for setting an aggregation condition as a condition for aggregating data of a sensor arranged on the self-propelled machine, a condition transmitting unit for transmitting, to the terminal system unit, the alarm delivery condition and aggregation condition so set, and a screen display unit for displaying various information, and the terminal system unit is provided with an alarm creation unit for creating alarm information on the self-propelled machine from the data of the sensor according to the alarm delivery condition so transmitted, an aggregate data creation unit for creating aggregate data from the data of the sensor according to the transmitted aggregation condition, and a data transmitting unit for transmitting, to the condition monitoring system unit, the alarm information and aggregate data so created.

According to the present invention as de scribed above, the condition monitoring system is configured such that the terminal system unit creates aggregate data (frequency data) according to the aggregation condition transmitted from the condition monitoring system unit and the terminal system unit transmits the aggregate data to the condition monitoring system unit. Compared with the case that time-series data of a sensor are transmitted, as they are, from the terminal system unit to the condition monitoring system unit, it is hence possible to reduce a communication load between the self-propelled machine and the condition monitoring system unit.

In the above-described configuration, it may be preferred to configure such that the condition monitoring system unit is provided with an operation mode condition setting unit for setting operation mode conditions as conditions for defining operation modes of the self-propelled machine, respectively, the alarm delivery condition can be set for every set one of the operation modes, and the aggregation condition can be set for the alarm delivery condition so set. According to this configuration, the alarm delivery condition and aggregation condition can be set for each operation mode so that the self-propelled machine can be appropriately monitored. Described specifically, the condition of the self-propelled machine can be monitored under a condition suited for each operation mode, thereby making it possible to avoid delivering an alarm unnecessarily.

In the above-described configuration, it may be preferred to configure such that the alarm delivery condition is set by a relational expression of the data of the sensor or processed data of the data and a first threshold value, and the alarm delivery condition setting unit changes the setting of the alarm delivery condition based on an input of a new first threshold value from outside, the aggregation condition is set by a width or number of bins, window width and aggregation time period for creating a histogram, and the aggregation condition setting unit changes the setting of the aggregation condition based on inputs of a new width or number of bins, window width and aggregation time period from outside, and the operation mode conditions are set by a relational expression of the data of the sensor or the processed data of the data and a second threshold value, and the operation mode condition setting unit changes the operation mode conditions based on an input of a new second threshold value from outside. According to this configuration, the alarm delivery condition, aggregation condition and operation mode conditions can be changed as needed, and therefore, still more appropriate condition monitoring is feasible.

In the above-described configuration, the alarm delivery condition setting unit may be configured to set the alarm delivery condition by using data of plural sensors as defined above or data obtained by subjecting processed data of these data to a multivariate analysis. According to this configuration, there is an advantage that the condition of the self-propelled machine can be monitored with still higher accuracy.

In the above-described configuration, the data transmitting unit may preferably transmit in priority one piece of the alarm information, said one piece of the alarm information having a high degree of deviation from the alarm delivery condition, because this configuration can perform appropriate condition monitoring while reducing the communication load still further.

In the above-described configuration, the data transmitting unit may be configured to transmit in priority one piece of the alarm information, said one piece of the alarm information having a high frequency of occurrence. When configured as described above, appropriate condition monitoring can also be performed while reducing the communication load still further.

In the above-described configuration, it may be preferred to configure such that the condition monitoring system unit displays, on the screen display unit, at least one of an expected number of alarm deliveries and an expected probability of alarm deliveries as calculated based on the alarm delivery conditions set by the alarm delivery condition setting unit and the aggregate data transmitted from the data transmitting unit. According to this configuration, various conditions can beset while confirming the expected number of alarm deliveries and the expected probability of alarm deliveries on a screen.

In the above-described configuration, the condition monitoring system unit may be configured to display, on the screen display unit, at least one of an expected number of alarm deliveries and an expected probability of alarm deliveries, which have been calculated based on the alarm delivery conditions set by the alarm delivery condition setting unit and the aggregate data transmitted from the data transmitting unit, for every set one of the operation modes. According to this configuration, various conditions can be set for each operation mode while confirming the expected number of alarm deliveries and the expected probability of alarm deliveries on the screen. It is, therefore, possible to increase the accuracy of condition monitoring of the self-propelled machine still further.

Further, it may also be configured that the condition monitoring system unit is connected to plural terminal system units as defined above, which are mounted on plural self-propelled machines as defined above, respectively, via the radiocommunication channels and that the condition monitoring system unit displays at least one of an expected number of alarm deliveries and an expected probability of alarm deliveries, which have been calculated based on the alarm delivery conditions set by the alarm delivery condition setting unit and the aggregate data transmitted from the data transmitting unit, with respect to every one of the self-propelled machines, side by side on the screen display unit. According to this configuration, various conditions can be set while comparing numerical values of the plural self-propelled machines, and therefore, the accuracy of condition monitoring of each self-propelled machine can be increased still further.

To achieve the above-described second object, the present invention also provides a condition monitoring system unit to be arranged at a control center and communicable, via radio-communication channels, with a terminal system unit mounted on a self-propelled machine, wherein the condition monitoring system unit is provided with an alarm delivery condition setting unit for setting an alarm delivery condition as a condition under which the self-propelled machine is to deliver an alarm, an aggregation condition setting unit for setting an aggregation condition as a condition for aggregating data of a sensor arranged on the self-propelled machine, a condition transmitting unit for transmitting, to the terminal system unit, the alarm delivery condition and aggregation condition so set, and a screen display unit for displaying at least one of an expected number of alarm deliveries and an expected probability of alarm deliveries as calculated based on the alarm delivery conditions set by the alarm delivery condition setting unit and aggregate data of the data of the sensor as transmitted from the terminal system unit.

According to the above-described condition monitoring system unit, it is only necessary to receive aggregate data of sensor data as transmitted from the terminal system unit. Compared with the case that time-series data of the sensor are received, the communication load can be reduced accordingly. In addition, various conditions can be set while confirming the expected number of alarm deliveries and the expected probability of alarm deliveries on the screen. Condition monitoring of still higher accuracy is thus feasible.

To achieve the above-described second object, the present invention also provides a terminal system unit to be mounted on a self-propelled machine and communicable, via radio-communication channels, with a condition monitoring unit system arranged at a control center, wherein:
the terminal system unit is provided with an alarm creation unit for creating alarm information on the self-propelled machine from data of a sensor arranged on the self-propelled machine according to an alarm delivery condition, as a condition under which the self-propelled machine delivers an alarm, when the alarm delivery condition is transmitted from the condition monitoring system unit, an aggregate data creation unit for creating aggregate data from the data of the sensor according to an aggregation condition, as a condition under which data of the sensor are to be aggregated, when the aggregation condition is transmitted from the condition monitoring system unit, and a data transmitting unit for transmitting, to the condition monitoring system unit, the alarm information and aggregate data so created.

According to the above-described terminal system unit, aggregate data can be created from data of the sensor according to the aggregation condition transmitted from the condition monitoring system unit, and the aggregate data can be transmitted to the condition monitoring system unit. Compared with the case that time-series data of the sensor are received, the communication load can be reduced.

According to the present invention, it is possible to reduce communication loads between the terminal system unit mounted on the self-propelled machine and the condition monitoring system unit arranged at the control center. It is to be noted that embodiments, configurations and advantageous effects of the present invention other than those described above will become apparent from the following description of an embodiment.

BRIEF DESCRIPTION OF THE DRAWINGS

FIG. 4 is a detailed diagram of an alarm delivery condition DB to be stored in a storage unit depicted in FIG. 3.

FIG. 5 is a detailed diagram of an aggregation condition DB to be stored in the storage unit depicted in FIG. 3.

FIG. 6 is a detailed diagram of an operation mode condition DB to be stored in the storage unit depicted in FIG. 3.

FIG. 9 is a diagram illustrating a specific example of a display screen of a screen display unit depicted in FIG. 3.

FIG. 12 is a detailed diagram of an alarm information DB to be stored in the storage unit depicted in FIG. 3.

FIG. 16 is a diagram illustrating a specific example of a format of data to be transmitted by the data transmitting unit depicted in FIG. 3.

FIG. 17 is a diagram illustrating a modification of the alarm information DB shown in FIG. 12.

FIG. 18 is a detailed diagram of an aggregate data DB when two sensors were used.

DETAILED DESCRIPTION OF PREFERRED EMBODIMENT

Figure 1:
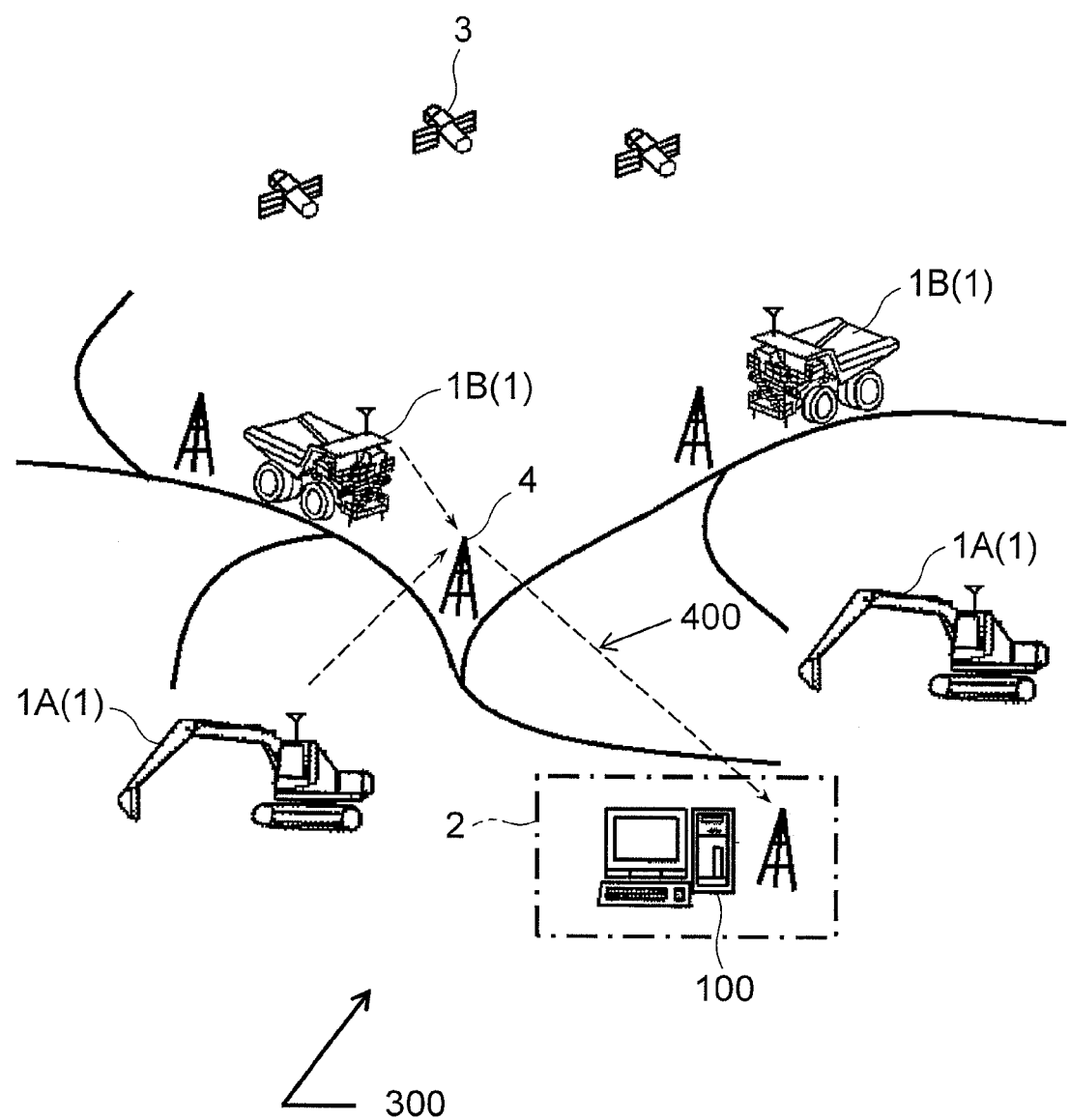
FIG. 1 is a schematic configuration diagram of a condition monitoring system according to an embodiment of the present invention.
Figure 2:
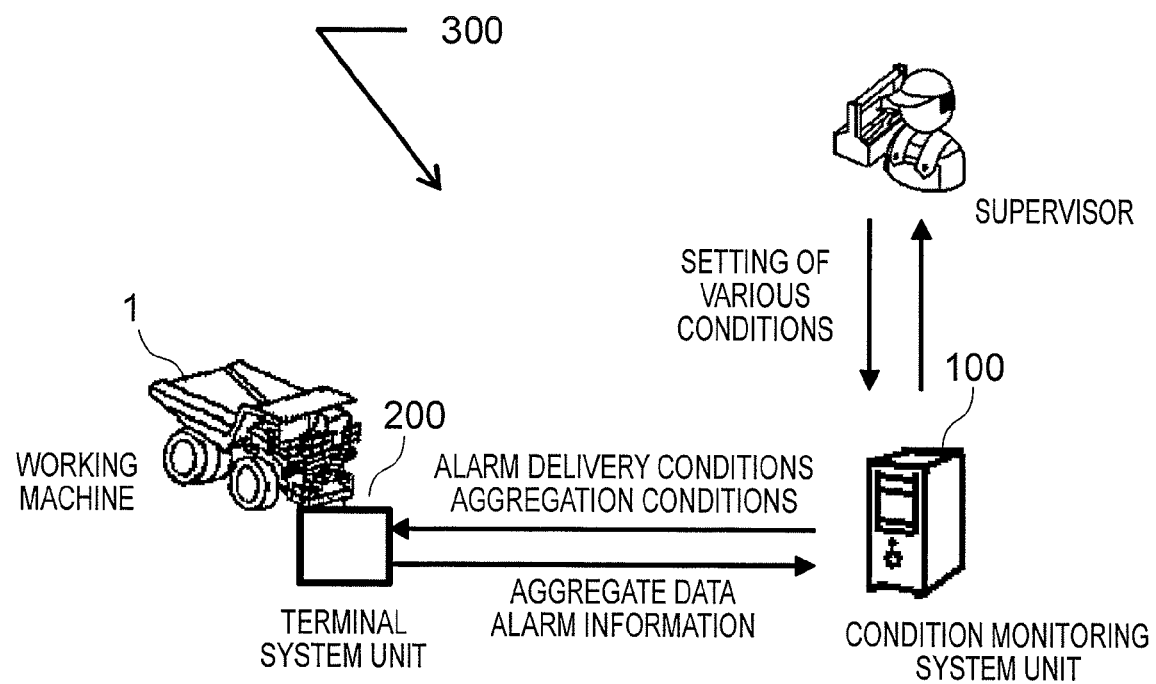
FIG. 2 is a schematic diagram illustrating flows of information in the condition monitoring system shown in FIG. 1.

With reference to the accompanying drawings, the present invention will hereinafter be described based on an embodiment applied to a system that monitors conditions of working machines used in amine or the like, such as excavators and dump trucks. FIG. 1 is a schematic diagram showing the overall configuration of a condition monitoring system according to the embodiment of the present invention. FIG. 2 is a diagram illustrating flows of information between a working machine as a target of monitoring and a condition monitoring system unit and between the condition monitoring system unit and a supervisor in the condition monitoring system shown in FIG. 1.

As illustrated in FIGS. 1 and 2, in a mine quarry, working machines (self-propelled machines) 1 such as excavators 1A and dump trucks 1B are used, and a condition monitoring system 300 is also employed to control the working machines 1. This condition monitoring system 300 includes a condition monitoring system unit 100, which is arranged at a control office (control center) 2 located near or remote from the quarry. Mounted on each working machine 1 include a position acquiring unit (not shown) for acquiring the position of the associated working machine by using GPS satellites 3, and various sensors (not shown).

A terminal system unit 200 on each working machine 1 is configured to transmit alarm information (an alarm indicating an abnormality of an engine, a pump or the like), operating information (a position, an operating time, respective sensor data, and the like) and machine information (the machine model and number, and the like) to the condition monitoring system unit 100 via a radiocommunication system (a radiocommunication unit on the side of the working machine 1, a relay station 4, a radiocommunication unit on the side of the control office 2, and the like).

The condition monitoring system unit 100 has a screen (see FIG. 9, etc.) for displaying alarm information received from the respective working machines 1, and the supervisor monitors the conditions of the working machines 1 while watching a display on the screen. Upon occurrence of a phenomenon, for example, that an alarm is frequently delivered with respect to a specific one of the working machines 1, the supervisor determines by watching the screen whether or not a condition for delivering an alarm (hereinafter called "the alarm delivery condition") has been appropriately set. When the alarm delivery condition is not determined to have been appropriately set, the supervisor resets the alarm delivery condition for the relevant working machine 1 via the screen of the condition monitoring system unit 100. The reset new alarm delivery condition is then transmitted to the working machine 1. The working machine 1 updates the stored alarm delivery condition to the newly-received alarm delivery condition.

Figure 3:
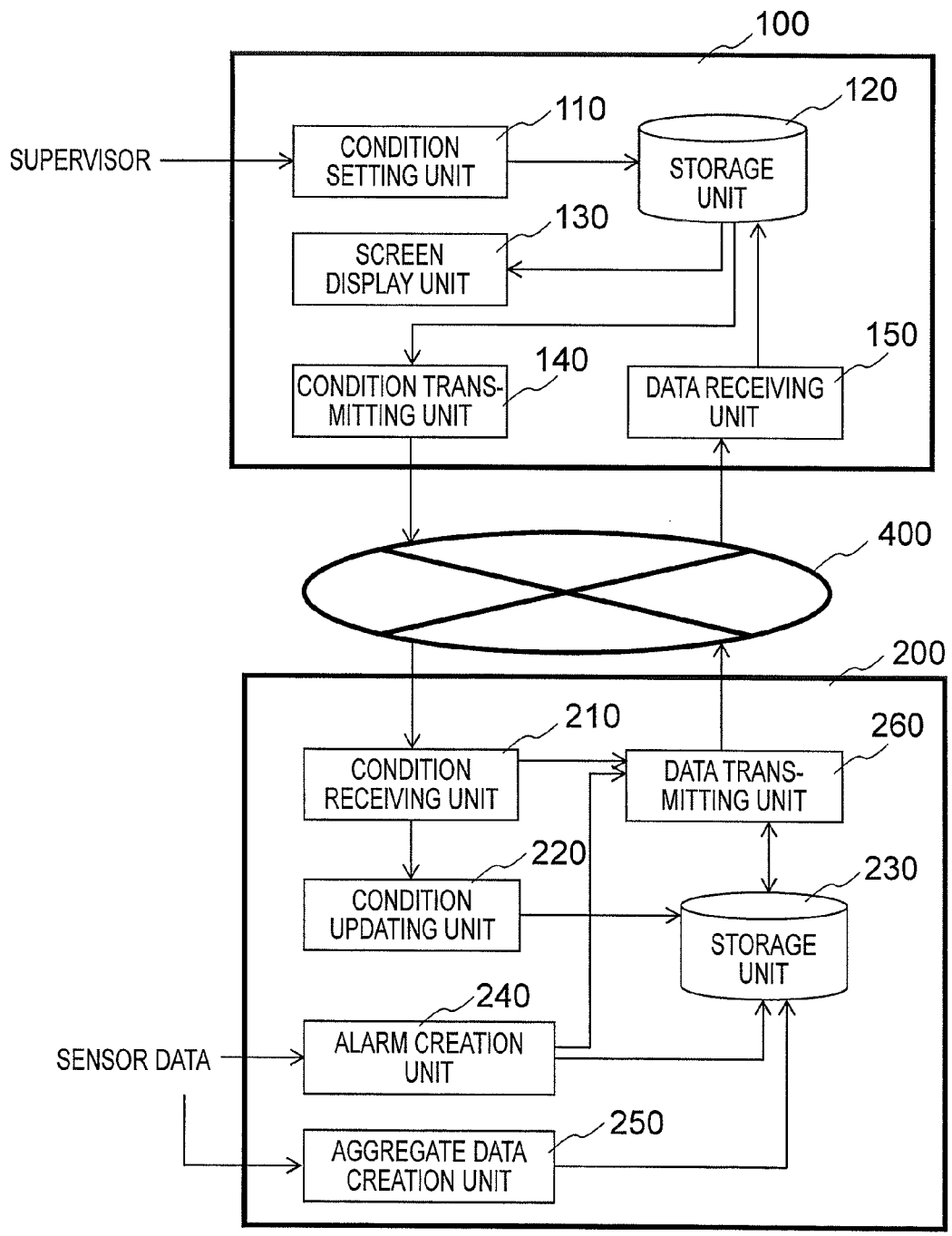
FIG. 3 is a block diagram of a condition monitoring system unit and terminal system unit depicted in FIG. 2.

Referring to FIG. 3, a description will next be made about the detailed configurations of the condition monitoring system unit and terminal system unit used in the condition monitoring system according to the embodiment of the present invention. FIG. 3 is a block diagram of the condition monitoring system unit and terminal system unit depicted in FIG. 2. As shown in FIG. 3, the condition monitoring system unit 100 is primarily constructed of a condition setting unit 110, a storage unit 120, a screen display unit 130, a condition transmitting unit 140, and a data receiving unit 150. On the other hand, the terminal system unit 200 is primarily constructed of a condition receiving unit 210, a condition updating unit 220, a storage unit 230, an alarm creation unit 240, an aggregate data creation unit 250, and a data transmitting unit 260.

The condition transmitting unit 140 of the condition monitoring system unit 100 and the condition receiving unit 210 of the terminal system unit 200 are connected together via the radiocommunication system 400, and the data receiving unit 150 of the condition monitoring system unit 100 and the data transmitting unit 260 of the terminal system unit 200 are connected together via the radiocommunication system 400. The condition monitoring system unit 100 and the terminal system unit 200 are, therefore, bidirectionally communicable with each other.

The condition setting unit 110, condition transmitting unit 140 and data receiving unit 150 are software programs to be executed by an unillustrated microprocessor, RAM, ROM and the like mounted on the condition monitoring system unit 100. On the other hand, the condition receiving unit 210, condition updating unit 220, alarm creation unit 240, aggregate data creation unit 250 and data transmitting unit 260 are software programs to be executed by an unillustrated microprocessor, RAM, ROM and the like mounted on the terminal system unit 200. The screen display unit 130 is a display screen such as a liquid crystal display.

According to inputs by the supervisor, the condition setting unit 110 sets alarm delivery conditions and aggregation conditions for each machine model and machine number to the condition monitoring system unit 100. The condition setting unit 110 is, therefore, equipped with both functions of the "alarm delivery condition setting unit" and the "aggregation condition setting unit". The term "machine model" as used herein means the model name of each working machine 1 such as an excavator or dump truck. On the other hand, the term "machine numbers" mean unique numbers assigned to identify machines of the same model from each other. Accordingly, each working machine 1 can be identified by its model and machine number.

The alarm delivery conditions and aggregation conditions so inputted are stored in the storage unit 120. With reference to information (which will be mentioned subsequently herein) displayed on the screen display unit 130, the supervisor operates a keyboard to directly input alarm delivery conditions in designated input boxes. The term "alarm delivery condition" as used herein means a condition under which an alarm is to be delivered with respect to each working machine 1, and this alarm delivery condition is defined by a relational equation of one or more corresponding sensor data relevant to the alarm or processed data of the sensor data and a threshold value (first threshold value). On the other hand, the term "aggregation condition" means a condition corresponding to the alarm delivery condition on a one-to-one basis, and is a condition for creating a histogram of the one or more sensor data relevant to the alarm of the working machine 1 or processed data of the sensor data. Described specifically, the width or number of bins and the window width of data processing time are set as aggregation conditions.

Further, such alarm delivery condition and aggregation condition can be set for each operation mode of every working machine 1. The term "operation mode" as used herein is synonymous with the condition of the working machine 1, and this operation mode is defined by a relational expression of a combination of data of one or more sensors on the working machine 1 or processed data of the sensor data and a threshold value (second threshold value). Different modes can, therefore, be defined by changing the setting of such a combination. It is to be noted that a condition for defining an operation mode will be called "an operation mode condition" in the following description.

By setting as an operation mode condition that the travel speed data of a dump truck is greater than 0, for example, an operation mode in which this condition is satisfied can be defined as "dump truck in traveling". By creating an alarm delivery condition and aggregation condition with respect to this operation mode, specific sensor data can be monitored during traveling of the dump truck.

The storage unit 120 stores the alarm delivery condition, aggregation condition and operation mode condition supplied from the condition setting unit 110, and also, the aggregate data supplied from the data receiving unit 150. Of the data so stored, the alarm delivery condition, aggregation condition and operation mode condition are supplied to the condition receiving unit 210 by the condition transmitting unit 140. The aggregate data are displayed on the screen display unit 130 when the supervisor inputs the alarm delivery condition to the condition setting unit 110 (in other words, upon setting the alarm delivery condition).

Figure 7:
FIG. 7 is a detailed diagram of an aggregate data to be stored in the storage unit depicted in FIG. 3.

The storage unit 120 is composed of an alarm delivery condition DB 1201 (see FIG. 4), aggregation condition DB 1202 (see FIG. 5), operation mode condition DB 1203 (see FIG. 6), and aggregate data DB 1204 (see FIG. 7). It is to be noted that "DB" is an abbreviation of data base. A description will hereinafter be made about details of the respective databases (DBs).

<Alarm Delivery Condition DB 1201>

Details of the alarm delivery condition DB 1201 are shown in FIG. 4. As shown in FIG. 4, the alarm delivery condition DB 1201 includes, as data items, the ID for distinguishing each alarm (alarm ID), alarm name, diagnosis method, sensor type, reference data, alarm delivery condition, the ID for identifying each operation mode (condition ID), and target model, and each row (1201*a* or 1201*b*) indicates a single set of alarm delivery conditions.

Under the item of alarm ID, unique IDs (for example, 1, 2), which have been defined to distinguish alarms in the condition monitoring system unit 100, are stored. Under the item of alarm name, the titles of alarms as inputted by the supervisor are stored. In FIG. 4, an engine abnormality (for example, an abnormality of engine speed, an abnormality of engine temperature, or the like) and a pump abnormality (for example, an abnormality of pump pressure, an abnormality of pump temperature, or the like) are illustrated.

Under the item of diagnosis method, the names of diagnosis methods, which have been selected by the supervisor from options provided beforehand as methods for diagnosing the presence or absence of abnormalities, are stored. In FIG. 4, two diagnosis methods, that is, the threshold value processing and K-means clustering are stored as diagnosis methods. Stored under the item of sensor type is at least one of the types of sensors (for example, sensors A, B, C and D) used in alarm delivery conditions.

Stored under the item of alarm delivery condition are conditional expressions for determining whether or not the sensor data as stored under the item of sensor type or processed data of these data are abnormal. When at least one of these conditional expressions is satisfied, an alarm is delivered with respect to the corresponding working machine 1. The setting of a more suitable alarm delivery condition becomes feasible by changing the conditional expression (specifically, the threshold value) stored under the item of alarm delivery condition, although its details will be described subsequently herein. It is to be noted that the supervisor inputs an appropriate alarm delivery condition while watching the aggregate data of the corresponding working machine 1 as displayed on the screen display unit 130.

Stored under the item of condition ID is an ID, which corresponds to the condition ID in the below-described operation mode condition DB 1203 of FIG. 6. Under the item of target model, model names (for example, Model-1, 2 and 3) to which the alarm delivery condition is to be applied are stored.

A description will now be made about the methods for diagnosing the presence or absence of abnormalities with respect to the working machines 1 by using the alarm delivery condition DB 1201. A description will first be made about the diagnosis method based on records 1201*a*. In the records 1201*a*, the condition ID is "1". It is, therefore, determined whether or not the data of the specific sensor α corresponding to the condition ID "1" satisfies the conditional expression "sensor α>0" (see FIG. 6). As the diagnosis method is "threshold value processing" in the records 1201*a*, it is also determined whether or not the data of the sensor A arranged on each of the target models (Model-1 and Model-2) satisfies the alarm delivery condition (sensor A≥10). When the conditional expression and alarm delivery condition are both determined to be satisfied, an alarm is delivered to notify an engine abnormality.

A description will next be made about the diagnosis method based on records 1201*b*. As nothing is described under the item of condition ID in the records 1201*b*, no determination is made on the operation mode. In other words, an abnormality diagnosis is conducted based on the records 1201*b* irrespective of the operation mode of each working machine. Because the diagnosis method is "the K-means clustering" in the records 1201*b*, a multivariate analysis making use of plural sensor data is conducted. The K-means clustering is a data classification method that classifies multivariate data without teaching data. The use of this method makes it possible to deem respective input data as points in the multivariate space, and further, to find out the clusters of the data while using, as bases, the closeness in Euclidean distance between the respective points.

In this embodiment, the data of the sensor B, sensor C and sensor D arranged on the target machine models (Model-1, Model-2, Model-3) are handled as multivariate data. The normal time-series data of the sensor B, sensor C and sensor D have been accumulated in the condition monitoring system unit 100 (not shown). The clusters of these time-series data have been calculated beforehand, and have been stored as detafile0 under the item of reference data in the alarm delivery condition DB 1201. At the respective working machines 1, the data of the sensor B, sensor C and sensor D are compared with the reference data to determine whether or not they are contained in the normal cluster. If anyone of their distances to the cluster satisfies the conditional expression (distance≥100) stored under the item of alarm delivery condition, an alarm is delivered to notify a pump abnormality.

<Alarm Delivery Condition DB 1202>

Details of the aggregation condition DB 1202 are shown in FIG. 5. As shown in FIG. 5, the aggregation condition DB 1202 includes, as data items, alarm ID, sensor type, window width, the number of bins, width, and aggregation time period, and each row (1202*a* or 1202*b*) indicates a single set of aggregation conditions. Under the item of alarm ID, IDs (for example, 1 and 2) are stored to facilitate corresponding to the alarm IDs in the alarm delivery condition DB 1201.

Under the item of sensor type, at least one of the types of sensors (for example, the sensors A, B, C and D), on which aggregate data is to be acquired, is stored. It is to be noted that the sensor types in the alarm delivery condition DB 1201 and the sensor types in the aggregation condition DB 1202 are the same insofar as the alarm IDs are the same. If the alarm ID is "1", for example, the information stored under the item of sensor type in records 1201*a* (see FIG. 4) and the information stored under the item of sensor type in records 1202*a* are both "sensor A".

Each working machine 1 starts the creation of aggregate data after the download of the corresponding aggregation condition. Under the item of aggregation time period in the aggregation condition DB 1202, information as to how long the data are to be aggregated from the start of the aggregation (for example, 1 day, 3 days) are stored. It is to be noted that, when no aggregation time period is designated, the aggregate data are continuously created as long as no cancellation command is issued from the condition monitoring system unit 100.

The aggregate data represents the distribution of (frequency information on) data, and can be visualized into a histogram. A histogram is a kind of statistical graph with classes being plotted along the abscissa and frequencies being plotted along the ordinate, and is a method for visually expressing the distribution of data. A histogram includes "the number of bins" that defines the number of classes and "width" that defines the width of the classes. It is to be noted that one of the number of bins and width is only needed to be defined for the creation of a histogram.

Figure 8A:
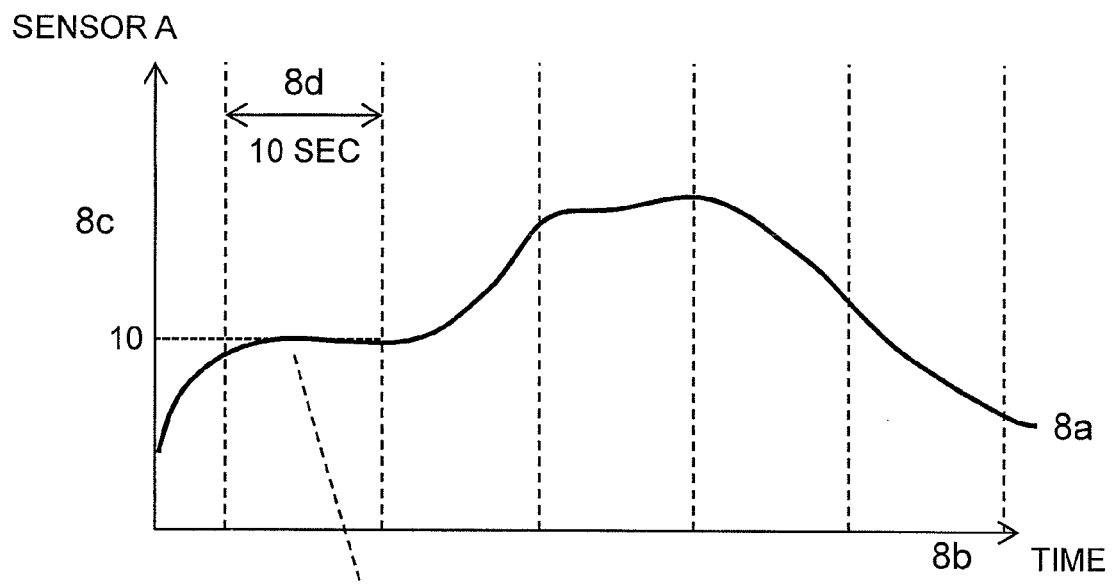
FIGS. 8A and 8B are diagrams illustrating specific examples of aggregate data created in this embodiment.
Figure 8B:
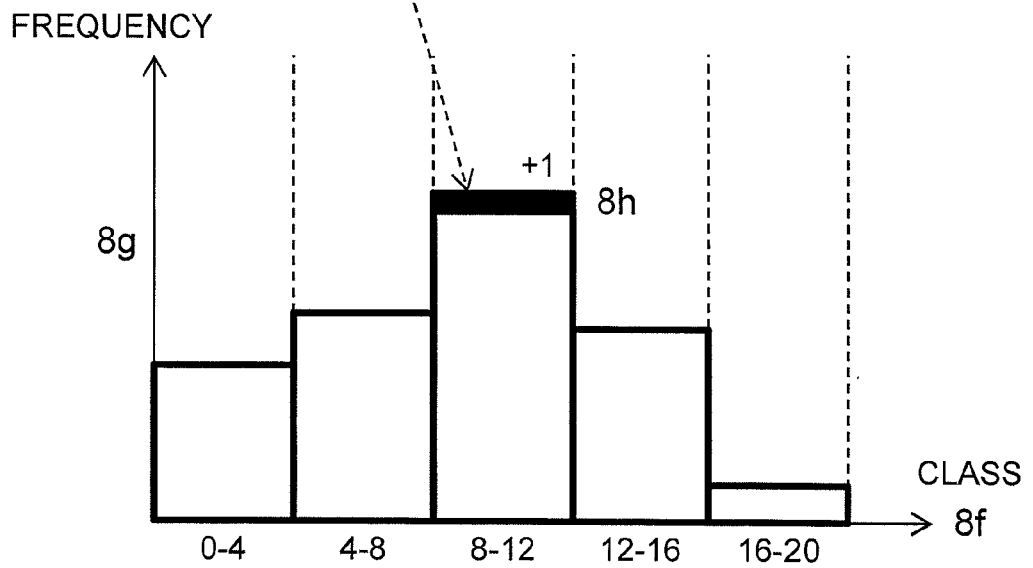

A description will next be made about specific examples of the creation of aggregate data. FIGS. 8A and 8B illustrate specific examples of the creation of aggregate data in the records 1202*a* in the aggregation condition DB 1202. In FIG. 8A, sign 8*a* indicates time-series data of the sensor A, the abscissa 8*b* represents time, and the ordinate 8*c* shows the value of the sensor A. A window width 8*d* indicates a range that determines the unit of aggregation, and the window width 8*d* in the records 1202*a* is 10 seconds. On the other hand, FIG. 8B is a histogram in which the aggregate data have been visualized, and the abscissa 8*f* and ordinate 8*g* represent class and the frequency of class, respectively.

For the creation of aggregate data, classes are first created by dividing the product of subtraction of a minimum value of the sensor A from a maximum value of the sensor A into five equal fractions (which are defined by the number of bins). The average of sensor values in each window (10 seconds in this example) is next determined. The class to which the average of the sensor values belongs is then determined, and "1" is added to the frequency in the relevant class (sign 8*h*). By preparing aggregate data in this manner, the time-series data are converted to the corresponding data of frequency. It is, therefore, possible to reduce the data size in comparison with the time-series data.

<Operation Mode Condition DB 1203>

Details of the operation mode condition DB 1203 are shown in FIG. 6. As shown in FIG. 6, the operation mode condition DB 1203 includes, as data items, the ID that identifies each operation mode (condition ID), sensor type, and conditional expression, and each row (1203*a* or 1203*b*) indicates a single set of operation mode conditions.

In the item of conditional expression in the 1203*a*, for example, "sensor $\alpha$>0" is stored. This conditional expression is defined using a threshold value like the alarm delivery condition in the records 1201*a* of FIG. 4. When the data of the sensor $\alpha$ is greater than 0 (second threshold value), the corresponding working machine 1 is determined to be under the condition of a predetermined operation mode. The use of the operation mode condition DB 1203 and alarm delivery condition DB 1201 can, therefore, deliver an alarm to notify a specific abnormality insofar as the working machine 1 is in the predetermined operation mode (for example, in swinging, in arm operation, in traveling, etc.). It is hence possible, for example, to configure such that, when the working machine 1 is in stoppage, no alarm is delivered even if the value of the sensor A is 10 or greater (see the records 1201*a* in FIG. 4) and that an alarm is allowed to be delivered only when the working machine 1 is in traveling.

It is to be noted that the data to be stored in the aggregation condition DB 1202 and operation mode condition DB 1203, respectively, can be inputted at the condition setting unit 110 while watching the screen display unit 130 of the condition monitoring system unit 100. The condition setting unit 110, therefore, also functions as "the operation mode condition setting unit" in the present invention. However, the data items, which the supervisor can set, in the aggregation condition DB 1202 are the window width, the number of bins or width, and aggregation time period. On the other hand, the data items, which the supervisor can set, in the operation mode condition DB 1203 are the sensor type and conditional expression.

<Aggregate Data DB 1204>

Details of the aggregate data DB 1204 are shown in FIG. 7. As shown in FIG. 7, the aggregate data DB 1204 includes, as data items, machine model, machine number, alarm ID, data collection time period, and data unit, and each row (1204a or 1204b) indicates a single set of aggregate data. The machine model and machine number make it possible to specify each working machine 1 on which aggregate data have been collected.

The alarm ID in the aggregate data DB 1204 is the same as the alarm ID in the alarm delivery condition DB 1201. Under the item of data collection time period, the start time and finish time of data collection are stored. Described specifically, the aggregate data of the sensor A, said aggregate data being shown in FIG. 8B, are stored in the data unit in records 1204a. As shown in FIG. 7, the aggregate data of the sensor A are composed of the classes of the sensor and their frequencies.

Referring back to FIG. 3, the screen display unit 130 is equipped with a function to display the respective data stored in the alarm delivery condition DB 1201 and also to enable the direct input and setting by the supervisor of the threshold value (first threshold value) as an alarm delivery condition, a function to display the number and probability of alarm deliveries (the sensitivity of the threshold value) as expected based on the inputted threshold value by using aggregate data (expected alarm delivery number display function), a function to display the respective data stored in the aggregation condition DB 1202 and also to enable the direct input and setting by the supervisor of window width, the number bins or width, and aggregation time period out of the data items in the aggregation condition DB 1202, a function to display the respective data stored in the operation mode condition DB 1203 and also to enable the direct input and setting by the supervisor of sensor type and threshold value (second threshold value) as a conditional expression out of the data items in the operation mode condition DB 1203, and to display various records in the past.

FIG. 9 is a diagram illustrating a screen layout of the screen display unit 130. In a display space 9a of the screen, the alarm ID, target machine model, alarm title, diagnosis method and condition ID in the records 1201a in the alarm delivery condition DB 1201 of FIG. 4 are displayed. Further, in the part of a display space 9b, the sensor type (the sensor A in this example) and alarm delivery condition in the records 1201a in the alarm delivery condition DB 1201 of FIG. 4 are displayed.

In input boxes 9c of threshold values as an alarm delivery condition, the supervisor can directly input numerical values. The display of "NaN" in the threshold input box 9c on the upper limit side means that no value is set. Because "the data of the sensor A is 10 or greater" as a delivery condition with respect to the sensor A in FIG. 9, for example, "10" (first threshold value) is displayed in one of the display boxes 9c, and "NaN" is displayed in the other display box.

Figure 10:
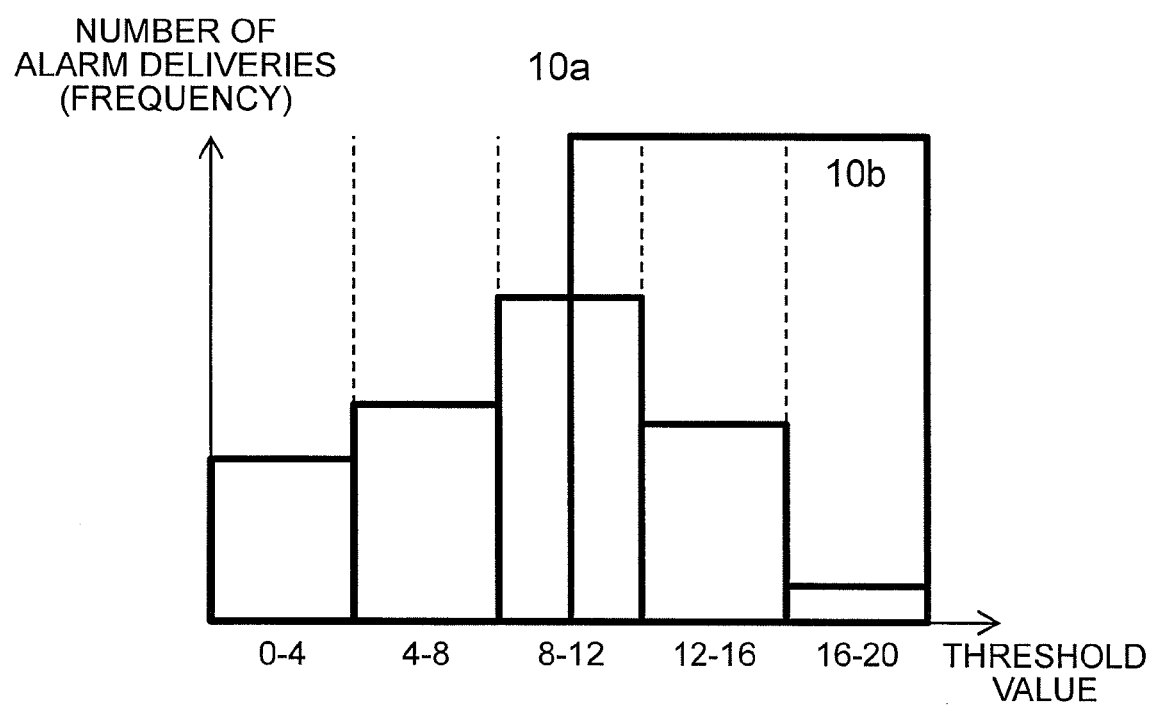
FIG. 10 is a diagram illustrating a specific example of a histogram to be displayed in a different window on the screen display unit when a window selector button depicted in FIG. 9 is pressed.

In a display table 9d, the number of alarm deliveries and probability of alarm deliveries as expected as a result of an analysis of aggregate data based on the values inputted in the threshold value input boxes 9c (in other words, the set alarm delivery condition) and the aggregation time period are displayed with respect to each machine number. When a window selector button 9e is pressed, a display of a graph of alarm delivery number vs. the threshold value of sensor data or processed data thereof is displayed in a different window on the screen. FIG. 10 is an example of the graph of alarm delivery number vs. the threshold value of data as displayed when the button 9e is pressed. Sign 10a designates a histogram of collected data of the sensor A. In FIG. 10, the ordinate of the histogram represents the number (frequency) of alarm deliveries, and the abscissa of the histogram represents threshold value. Sign 10b shows in highlight a section designated by the inputted sensor threshold values. As a consequence, it is possible to visually grasp how many alarms would be delivered under the alarm delivery condition set by the supervisor.

It is to be noted that, when a button 9f is pressed, the alarm ID, sensor type, window width, bin number, width and aggregation time period in the aggregation condition DB 1202 of FIG. 5 are displayed in a similar pattern as the display space 9a. In addition, input boxes like the threshold value input boxes 9c are also displayed such that the supervisor can directly input respective data of the window width, bin number or width, and aggregation time period.

Further, when a button 9g is pressed, the condition ID, sensor type and conditional expression in the operation mode setting condition DB 1203 of FIG. 6 are displayed in a similar pattern as the display space 9a. In addition, input boxes like the threshold value input boxes 9c are also displayed such that the supervisor can directly input respective data of the sensor type and conditional expression. Although not illustrated, the expected number of alarm deliveries and probability of alarm deliveries and the aggregation time period are displayed in a similar pattern as the display table 9 at this time with respect to each operation mode on the screen display unit 130. When a button 9h is pressed, stored various data in the past are displayed.

Figure 11:
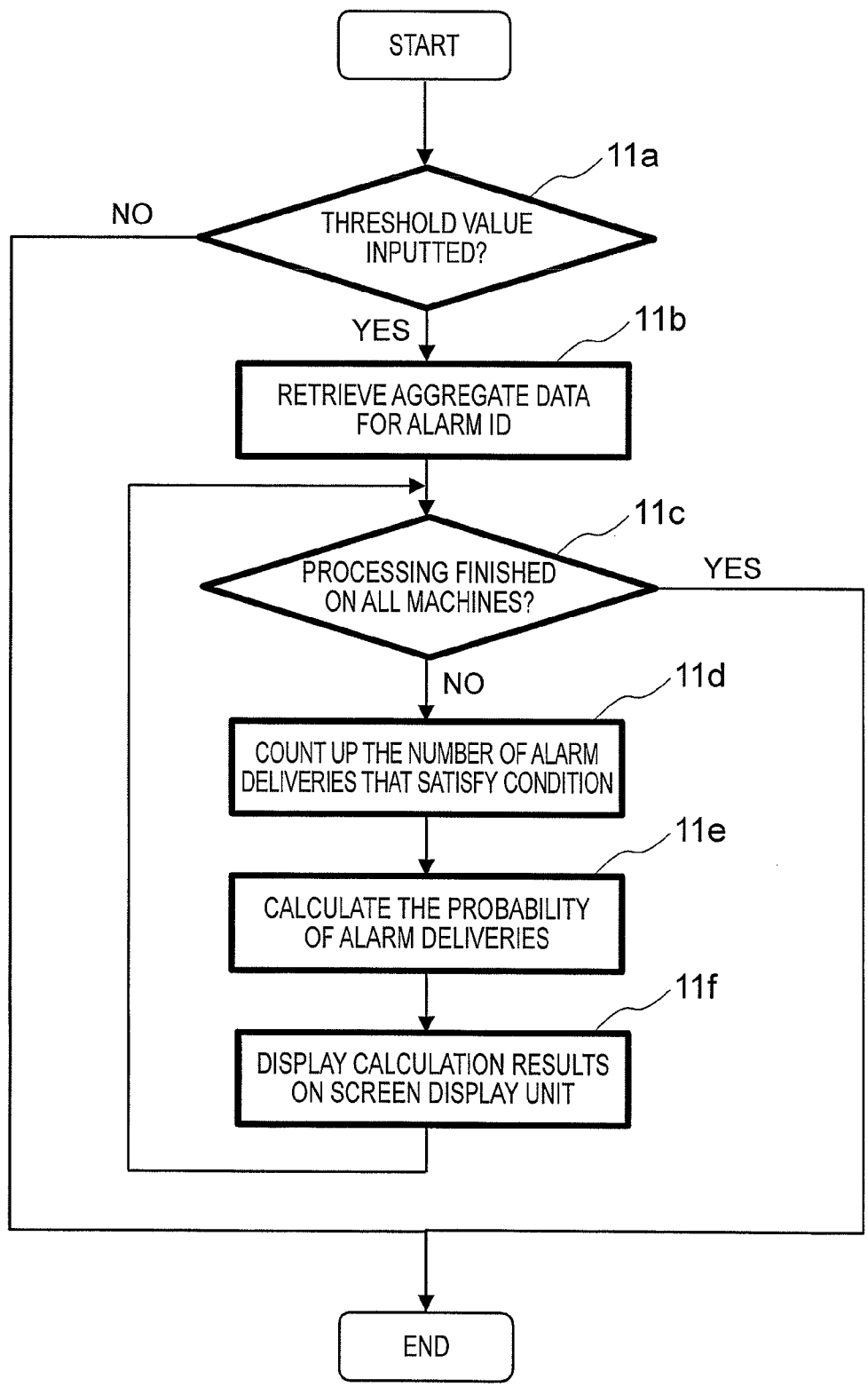
FIG. 11 is a flow chart illustrating a processing procedure for displaying the expected number and probability of alarm deliveries shown in FIG. 9.

A description will next be made about control processing for displaying an expected number of alarm deliveries and an expected probability of alarm deliveries. FIG. 11 is a processing flow chart from the input of threshold value data in the threshold value input boxes 9c until the display of an expected number of alarm deliveries and an expected probability of alarm deliveries. It is to be noted that this processing is repeatedly executed at intervals of a constant time. In step 11a, the condition monitoring system unit 100 first determines whether or not any threshold values have been inputted in the threshold value input boxes 9c of FIG. 9. If no threshold values have been inputted ("NO" in step 11a), the condition monitoring system unit 100 ends the processing. If any threshold values have been inputted ("YES" in step 11a), the condition monitoring system unit 100 in step 11b retrieves data, which satisfy the alarm ID and machine model displayed in the display space 9a, from the aggregate data DB 1204 (see FIG. 7). The condition monitoring system unit 100 next determines in step 11c whether or not the processing has been executed with respect to all the machines from which data had been acquired.

If the processing has been finished with respect to all the machines ("YES" in step 11c), the condition monitoring system unit 100 ends the processing. If the processing has not been finished yet on all the machines ("NO" in step 11c), on the other hand, the condition monitoring system unit 100 in step 11d extracts all classes of the histogram, which satisfy the threshold value, and calculates the total sum of the numbers of alarm deliveries in the extracted classes. The number of alarm deliveries so calculated in step 11d is the expected number of alarm deliveries, which may hereinafter be referred to as "expected alarm delivery number", to be displayed in the display table 9d of FIG. 9.

Further, in step 11e, the condition monitoring system unit 100 calculates the probability of alarm deliveries, which may hereinafter be referred to as "alarm delivery probability". The alarm delivery probability P is obtained by multiplying the expected alarm delivery number n, which has been calculated in step 11*d*, with the window width w in the aggregation condition DB 1202 and then dividing the multiplication product with a data collection time period t (calculated from the data collection time period in the aggregate data DB 1204). The specific equation can be expressed as follows:

$$P=(n\times w)/t \quad \text{Equation 1}$$

This alarm delivery probability P is the expected probability of alarm deliveries.

Next, in step 11*f*, the condition monitoring system unit 100 displays the expected number of alarm deliveries, the expected probability of alarm deliveries, and the aggregation time period in the display table 9*d* (see FIG. 9) of the screen display unit 130, and the routine then returns to step 11*c*.

Referring back to FIG. 3 again, the condition transmitting unit 140 retrieves the updated delivery condition DB 1201, aggregation condition DB 1202 and operation mode condition DB 1203 from the storage unit 120, and transmits them to the condition receiving unit 210 of the terminal system unit 200. The data receiving unit 150 receives the alarm information and aggregate data from the data transmitting unit 260 of the terminal system unit 260, and records them in the storage unit 120.

The condition receiving unit 210 receives the alarm delivery condition DB 1201, aggregation condition DB 1202 and operation mode condition DB 1203 from the condition transmitting unit 140 of the condition monitoring system unit 100. The condition updating unit 220 writes, in the storage unit 230, the alarm delivery condition DB 1201, aggregation condition DB 1202 and operation mode condition DB 1203 supplied from the condition receiving unit 210.

The storage unit 230 stores therein the alarm delivery condition DB 1201, aggregation condition DB 1202, operation mode condition DB 1203 and aggregate data. The data format at this time is composed of the data format of the storage unit 120 of the condition monitoring system unit 100 and an alarm information DB 2201 shown in FIG. 12 and added to the data format of the storage unit 120. As shown in FIG. 12, the alarm information DB 2201 is composed of the model, machine number, alarm ID and delivery time of alarm relevant to each working machine 1 on which the terminal unit system 200 is mounted. Each row (2201*a* or 2201*b*) of this alarm information DB 2201 makes up a single set of alarm information. This alarm information DB 2201 is supplied to the data receiving unit 150 of the condition monitoring system unit 100 by the data transmitting unit 260.

Figure 13:
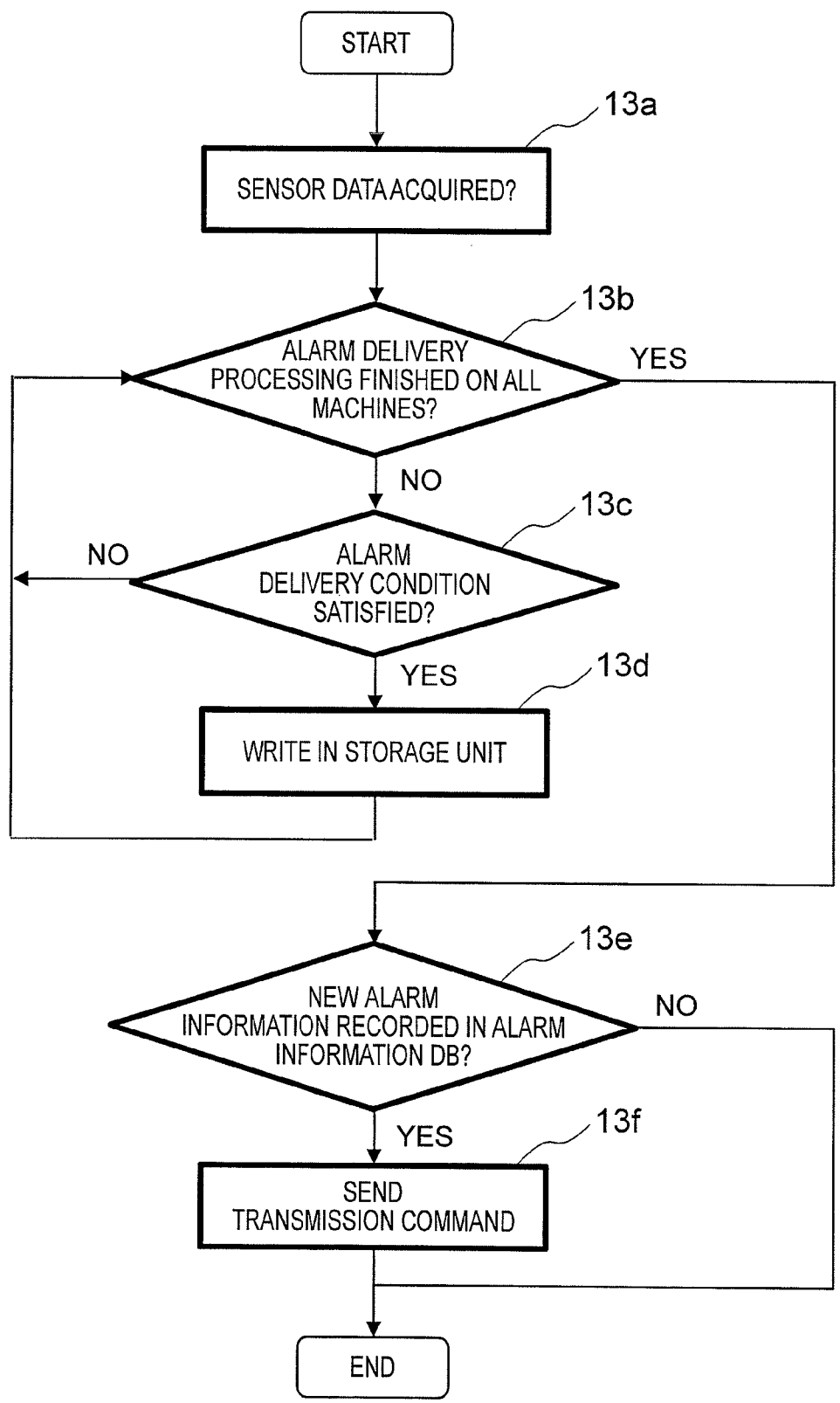
FIG. 13 is a flow chart illustrating a processing procedure at an alarm creation unit depicted in FIG. 3.

The alarm creation unit 240 is inputted with sensor data of each working machine 1, and creates alarm information with reference to the corresponding alarm delivery condition stored in the storage unit 230. Subsequent to the creation, the alarm creation unit 240 writes the alarm information in the alarm information DB 2201 in the storage unit 230. A processing flow at the alarm creation unit 240 is illustrated in FIG. 13. This processing flow is executed at the timing of acquisition of the sensor data.

In step 13*a*, the alarm creation unit 240 acquires all the sensor data of the working machine 1. Next, in step 13*b*, the alarm creation unit 240 determines with respect to all the machines whether or not an alarm delivery processing has been finished. The term "alarm delivery processing" as used herein means a processing that determines whether or not the sensor data acquired in step 13*a* satisfy all the corresponding alarm delivery conditions which are defined in the alarm delivery condition DB 1201 stored in the storage unit 230. If the alarm delivery processing has been finished with respect to all the machines ("YES" in step 13*b*), the routine then advances to step 13*e*. If the alarm delivery processing has not been finished with respect to all the machines ("NO" in step 13*b*), the routine advances to step 13*c*.

In step 13*c*, the alarm creation unit 240 determines with respect to each sensor type stored in the alarm delivery condition DB 1201 whether or not the sensor data satisfy the corresponding alarm delivery condition. If the alarm delivery condition is satisfied ("YES" in step 13*c*), the alarm creation unit 240 writes the alarm information in the alarm information DB 2201 in the storage unit 230. If the alarm delivery condition is not satisfied ("NO" in step 13*c*), the routine returns to step 13*b*.

In step 13*e*, the alarm creation unit 240 determines whether or not any new alarm information has been recorded in the alarm information DB 2201 in the storage device 230. If any new alarm information has been recorded ("YES" in step 13*e*), the routine advances to step 13*f*. In step 13*f*, the alarm creation unit 240 sends a transmission command of the alarm information to the data transmitting unit 260, and the processing is ended. If any new alarm information has not been recorded ("NO" in step 13*e*), the processing is ended.

Figure 14:
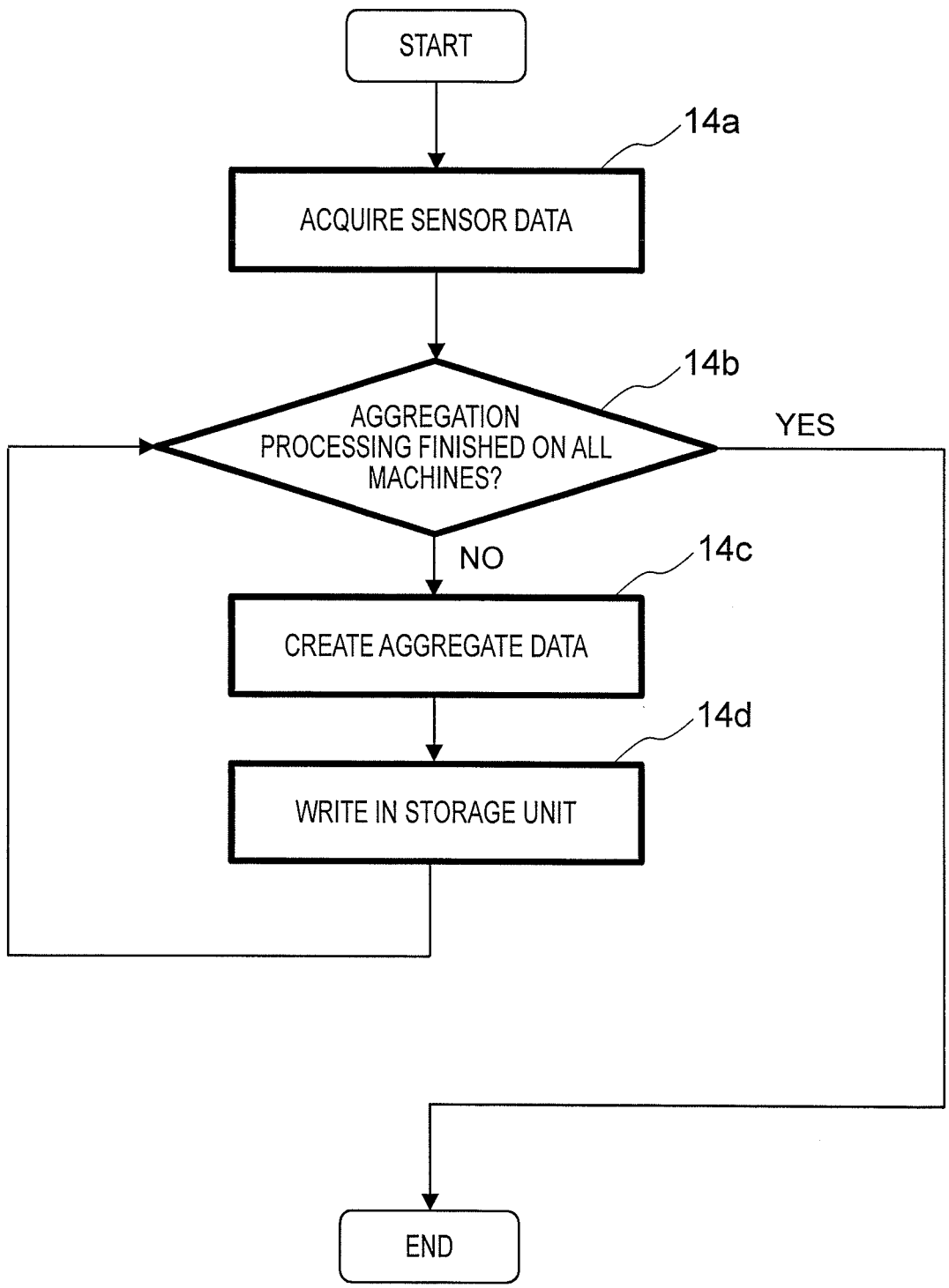
FIG. 14 is a flow chart illustrating a processing procedure at an aggregate data creation unit depicted in FIG. 3.

The aggregate data creation unit 250 is inputted with the sensor data of each working machine 1, and with reference to the aggregation condition DB 1202 stored in the storage unit 230, creates aggregate data. Subsequent to the creation, the aggregate data creation unit 250 writes the aggregate data in the aggregate data DB 1204 in the storage unit 230. A processing flow at the aggregate data creation unit 250 is illustrated in FIG. 14. This processing flow is executed at the timing of acquisition of the sensor data.

In step 14*a*, the aggregate data creation unit 250 acquires all the sensor data of the working machine 1. Next, in step 14*b*, the aggregate data creation unit 250 determines with respect to all the machines whether or not the aggregation processing has been finished. The term "aggregation processing" as used herein means a processing that converts the sensor data (time-series data), which have been acquired in step 14*a*, to aggregation data (frequency data) according to the aggregation conditions defined in aggregation condition DB 1202 stored in the storage unit 230. If the aggregation processing has been finished with respect to all the machines ("YES" in step 14*b*), the processing is ended. If the aggregation processing has not been finished with respect to all the machines ("NO" in step 14*b*), the routine advances to step 14*c*. In step 14*c*, the aggregation data creation unit 250 acquires the sensor data of the respective sensor types as stored in the aggregation condition DB 1202, and creates aggregate data from the sensor data. Next, in step 14*d*, the aggregate data creation unit 250 writes the aggregate data in the aggregate data DB 1204 in the storage unit 230.

Figure 15:
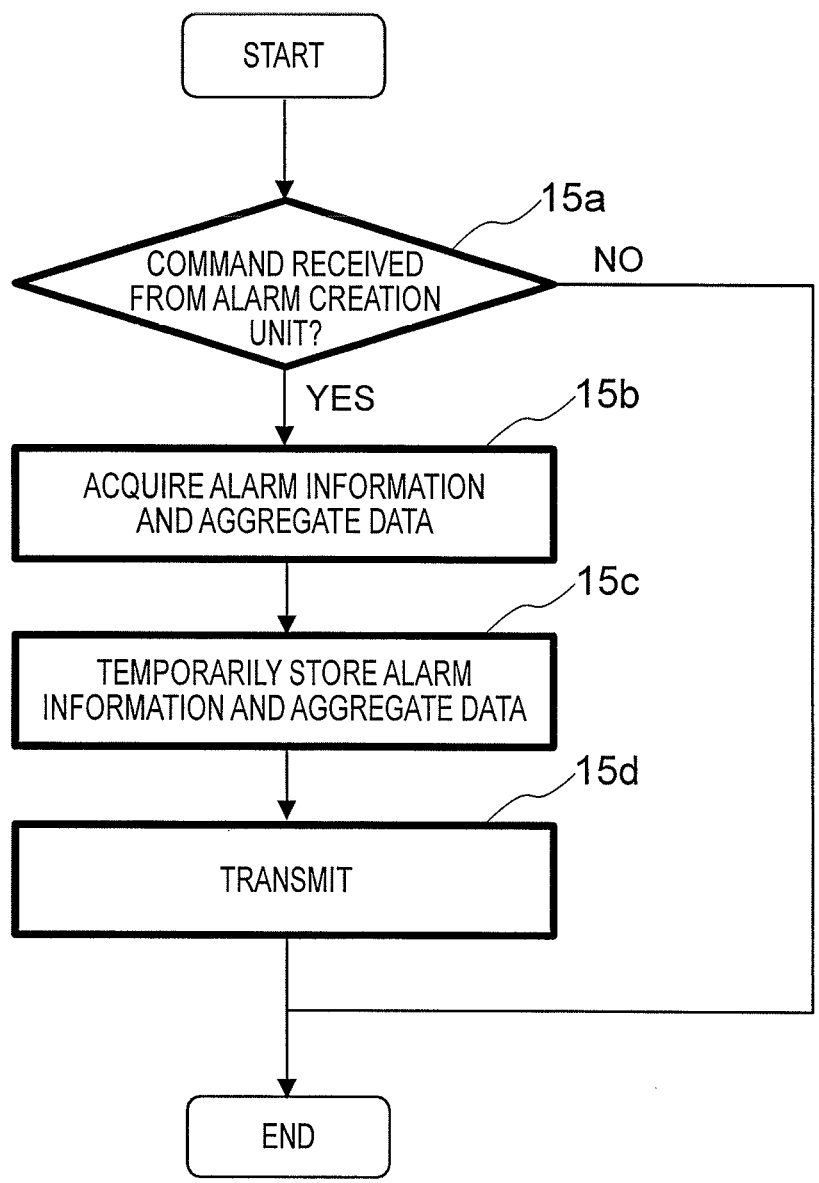
FIG. 15 is a flow chart illustrating a processing procedure at a data transmitting unit depicted in FIG. 3.

Upon input of the transmission command from the alarm creation unit 240, the data transmitting unit 260 acquires the alarm information DB 2201 newly recorded in the storage unit 230 and the aggregate data DB 1204 relating to the new alarm information, and transmits them to the data receiving unit 150. A processing flow at the data transmitting unit 260 is illustrated in FIG. 15. In step 15*a*, the data transmitting unit 260 determines whether or not the transmission command has been inputted from the alarm creation unit 240. If no transmission command has been inputted ("NO" in step 15*a*), the processing is ended. If the transmission command has been inputted ("YES" in step 15*a*), the routine advances to step 15*b*.

In step 15*b*, the data transmitting unit 260 acquires alarm information, which is to be transmitted, from the alarm information DB 2201 in the storage unit 230 with reference to each alarm ID, and acquires the aggregate data, which relate to the alarm, from the aggregate data DB 1204 in the storage unit 230 with reference to each alarm ID. Next, in step 15*c*, the data transmitting unit 260 stores the alarm information and aggregate data, which have been acquired in step 15*b*, in a primary storage device (not shown). Next, in step 15*d*, the data transmitting unit 260 transmits the alarm information and aggregate data, which are stored in the primary storage device, to the data receiving unit 150 of the condition monitoring system unit 110.

The format of the data transmitted in step 15*d* is illustrated in FIG. 16. As illustrated in FIG. 16, the data transmitting unit 260 transmits, to the data receiving unit 150, data of a format that includes the aggregate data added thereto and relating to the alarm information DB 2201 in the storage unit 230. It is to be noted that the contents of the aggregate data are similar to the aggregate data DB 1204 in the storage unit 120.

It is to be noted that in step 15*d*, the data transmitting unit 260 may transmit the data with priorities being placed on the alarm information. In this case, there is a method such that the priorities are set in the decreasing order of the degree of deviation from the threshold value as the alarm delivery condition (method 1), or that the past alarm information is kept stored and the priorities are set in the decreasing order of the frequency of alarms (method 2).

To realize the method 1 and method 2, a modification of the alarm information DB stored in the storage unit 230 is illustrated in FIG. 17. FIG. 17 illustrates details of an alarm information DB 2201-1 when priorities are placed on the alarm information. As illustrated in FIG. 17, the alarm information DB 2201-1 has been prepared by adding, to the alarm information of FIG. 12, the information as to whether or not the data transmitting unit 260 has transmitted (transmitted flag) and the degrees of deviation of sensor data from the corresponding threshold values.

As the transmitted flag, "1" is inputted when the alarm information has been transmitted at the data transmitting unit 260 but "0" is inputted when the alarm information has not been transmitted. The term "degree of deviation" is an index representing how much a sensor data and its corresponding threshold value are apart from each other. When the threshold value for the sensor A is 10 and the data of the sensor A is 100, for example, the degree of deviation is 90. The greater this degree of deviation, the greater the degree that indicates an abnormality, and the more important the alarm information. It is the method 1 that the order of priorities is set depending on the degrees that indicate abnormalities (the decreasing order of the degree of deviation from the threshold as an alarm condition).

On the other hand, the method 2 (the decreasing order of the frequency of alarms) is a method that the information the transmitted flag of which is "1" is aggregated for its frequency with respect to each alarm ID and that priorities are attached to alarms in the decreasing order of frequency. This is based on the thinking that an alarm of greater frequency is more important.

Further, the alarm delivery condition DB 1201 is not limited to the threshold value of one sensor data only. The alarm delivery condition may be set based on a combination of two or more sensor data. In this case, the aggregation condition of the aggregation condition DB 1202 is also defined by plural sensors for a single alarm ID. FIG. 18 is an example of the aggregate data DB 1204 of two sensors (sensor A, sensor B). A row 18*a* represents the classes of sensor A, while a row 18*b* represents classes of the sensor B. Frequencies are stored in the relevant cells. When the data of the sensor A is 10 and the data of the sensor B is 100, for example, "1" is added as a frequency to the cell of sign 18*c*.

Figure 19:
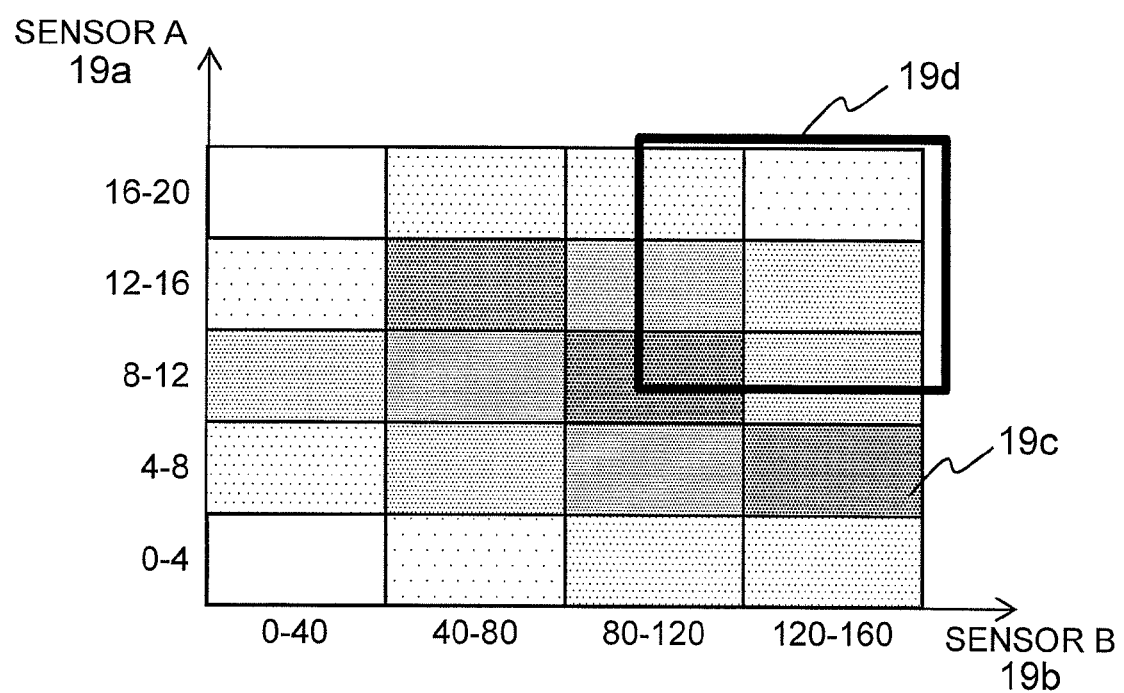
FIG. 19 is a diagram illustrating a specific example of a display of threshold values for sensors and relevant cells in a bivariate histogram.

At this time, a graph of relationship between the number of alarm deliveries and threshold value (which is equivalent to FIG. 10 when the button 9*e* of FIG. 9 is pressed) as displayed on the screen display unit 130 is a bivariate histogram. A display example of the bivariate histogram is illustrated in FIG. 19. An ordinate 19*a* represents the classes of the sensor A, while an abscissa 19*b* represents the classes of the sensor B. By classes of the sensor A and sensor B, the relevant cells are divided into a grid 19*c*, and the magnitude of the frequency is expressed by the color in the grid. Upon expressing threshold values of 10 and greater for the sensor A and 20 and greater but 100 or smaller for the sensor B in a bivariate histogram, a relevant part 19*d* is displayed in highlight.

As described above, the following advantageous effects can be brought about according to the above-described embodiment. Described specifically, the condition monitoring system unit 100 is only needed to receive alarm information and aggregate data from the terminal system unit 200, and therefore, communication loads can be reduced compared with the case that time-series data of sensors are received. In addition, the supervisor can set threshold values for various conditions such as alarm delivery conditions while confirming an expected number of alarm deliveries and an expected probability of alarm deliveries as displayed on the screen display unit 130, and therefore, appropriate condition monitoring conforming to each environment of use is feasible. Described specifically, it is possible to eliminate as much as possible situations where alarms occur frequently, or conversely, situations where alarms are not delivered despite abnormalities, and to perform the monitoring of the condition of the self-propelled machine sufficiently as needed. Further, the terminal system unit 200 is only needed to transmit the aggregate data of sensor data and alarm information to the condition monitoring system unit 100, and therefore, communication loads can be reduced compared with the case that time-series data of sensors are transmitted.

It is to be noted that the above-described embodiment is illustrative for the description of the invention and is not intended to limit the scope of the present invention to the embodiment only. Those skilled in the art can carry out the present invention in various other embodiments without departing from the gist of the present invention.

For example, the present invention can be applied to a system that monitors the conditions of self-propelled working machines used in a work site, such as wheel loaders and cranes, and can also be applied to a system that monitors the conditions of automobiles or railroad trains. In other words, the present invention can be widely used in all systems that monitor the conditions of self-propelled machines.

The invention claimed is:

1. A condition monitoring system comprising a terminal system unit, which is mounted on a self-propelled machine, and a condition monitoring system unit, which is arranged at a control center, connected together via radiocommunication channels, wherein:
    the condition monitoring system unit is provided with an alarm delivery condition setting unit for setting an alarm delivery condition as a condition under which the self-propelled machine is to deliver an alarm, an aggregation condition setting unit for setting an aggregation condition as a condition for aggregating data of a sensor arranged on the self-propelled machine, a condition transmitting unit for transmitting, to the terminal system unit, the alarm delivery condition and aggregation condition so set, and a screen display unit for displaying various information, and the terminal system unit is provided with an alarm creation unit for creating alarm information on the self-propelled machine from the data of the sensor according to the alarm delivery condition so transmitted, an aggregate data creation unit for creating aggregate data from the data of the sensor according to the transmitted aggregation condition, and a data transmitting unit for transmitting, to the condition monitoring system unit, the alarm information and aggregate data so created.

2. The condition monitoring system according to claim 1, wherein:

the condition monitoring system unit is provided with an operation mode condition setting unit for setting operation mode conditions as conditions for defining operation modes of the self-propelled machine, respectively, the alarm delivery condition can be set for every set one of the operation modes, and the aggregation condition can be set for the alarm delivery condition so set.

3. The condition monitoring system according to claim 2, wherein:

the alarm delivery condition is set by a relational expression of the data of the sensor or processed data of the data and a first threshold value, and the alarm delivery condition setting unit changes the setting of the alarm delivery condition based on an input of a new first threshold value from outside, the aggregation condition is set by a width or number of bins, window width and aggregation time period for creating a histogram, and the aggregation condition setting unit changes the setting of the aggregation condition based on inputs of a new width or number of bins, window width and aggregation time period from outside, and the operation mode conditions are set by a relational expression of the data of the sensor or the processed data of the data and a second threshold value, and the operation mode condition setting unit changes the operation mode conditions based on an input of a new second threshold value from outside.

4. The condition monitoring system according to claim 3, wherein:

the alarm delivery condition setting unit sets the alarm delivery condition by using data of plural sensors or data obtained by subjecting processed data of these data to a multivariate analysis.

5. The condition monitoring system according to claim 1, wherein:

the data transmitting unit transmits in priority one piece of the alarm information, said one piece of the alarm information having a high degree of deviation from the alarm delivery condition.

6. The condition monitoring system according to claim 1, wherein:

the data transmitting unit transmits in priority one piece of the alarm information, said one piece of the alarm information having a high frequency of occurrence.

7. The condition monitoring system according to claim 1, wherein:

the condition monitoring system unit displays, on the screen display unit, at least one of an expected number of alarm deliveries and an expected probability of alarm deliveries as calculated based on the alarm delivery conditions set by the alarm delivery condition setting unit and the aggregate data transmitted from the data transmitting unit.

8. The condition monitoring system according to claim 2, wherein:

the condition monitoring system unit displays, on the screen display unit, at least one of at least one of an expected number of alarm deliveries and an expected probability of alarm deliveries, which have been calculated based on the alarm delivery conditions set by the alarm delivery condition setting unit and the aggregate data transmitted from the data transmitting unit, for every set one of the operation modes.

9. The condition monitoring system according to claim 1, wherein:

the condition monitoring system unit is connected to plural terminal system units, which are mounted on plural self-propelled machines, respectively, via the radiocommunication channels, and the condition monitoring system unit displays at least one of an expected number of alarm deliveries and an expected probability of alarm deliveries, which have been calculated based on the alarm delivery conditions set by the alarm delivery condition setting unit and the aggregate data transmitted from the data transmitting unit, with respect to every one of the self-propelled machines, side by side on the screen display unit.

10. A condition monitoring system unit to be arranged at a control center and communicable, via radiocommunication channels, with a terminal system unit mounted on a self-propelled machine, wherein:

the condition monitoring system unit is provided with an alarm delivery condition setting unit for setting an alarm delivery condition as a condition under which the self-propelled machine is to deliver an alarm, an aggregation condition setting unit for setting an aggregation condition as a condition for aggregating data of a sensor arranged on the self-propelled machine, a condition transmitting unit for transmitting, to the terminal system unit, the alarm delivery condition and aggregation condition so set, and a screen display unit for displaying at least one of an expected number of alarm deliveries and an expected probability of alarm deliveries as calculated based on the alarm delivery conditions set by the alarm delivery condition setting unit and aggregate data of the data of the sensor as transmitted from the terminal system unit.

11. A terminal system unit to be mounted on a self-propelled machine and communicable, via radiocommunication channels, with a condition monitoring unit system arranged at a control center, wherein:

the terminal system unit is provided with an alarm creation unit for creating alarm information on the self-propelled machine from data of a sensor arranged on the self-propelled machine according to an alarm delivery condition, as a condition under which the self-propelled machine delivers an alarm, when the alarm delivery condition is transmitted from the condition monitoring system unit, an aggregate data creation unit for creating aggregate data from the data of the sensor according to an aggregation condition, as a condition under which data of the sensor are to be aggregated, when the aggregation condition is transmitted from the condition monitoring system unit, and a data transmitting unit for transmitting, to the condition monitoring system unit, the alarm information and aggregate data so created.

12. The condition monitoring system according to claim 2, wherein:
  the data transmitting unit transmits in priority one piece of the alarm information, said one piece of the alarm information having a high degree of deviation from the alarm delivery condition.

13. The condition monitoring system according to claim 2, wherein:
  the data transmitting unit transmits in priority one piece of the alarm information, said one piece of the alarm information having a high frequency of occurrence.

* * * * *